US005629091A

United States Patent [19]

Rao et al.

[11] Patent Number: 5,629,091

[45] **Date of Patent: *May 13, 1997**

[54] AGGLOMERATED ANTI-FRICTION GRANULES FOR PLASMA DEPOSITION

[75] Inventors: V. Durga N. Rao, Bloomfield Township; Robert A. Rose, Grosse Pointe Park; David A. Yeager, Plymouth; Carlo A. Fucinari, Farmington Hills, all of Mich.

[73] Assignee: Ford Motor Company, Dearborn, Mich.

[ * ] Notice: The term of this patent shall not extend beyond the expiration date of Pat. No. 5,332,427.

[21] Appl. No.: 352,484

[22] Filed: Dec. 9, 1994

[51] Int. Cl.$^6$ .......................... B32B 5/16

[52] U.S. Cl. .......................... 428/403; 428/407; 428/697; 428/698; 428/699; 428/704; 428/913

[58] Field of Search .......................... 428/402, 403, 428/404, 407, 696, 697, 698, 699, 704, 539.5, 913; 7/484, 523; 75/252, 253, 254

[56] References Cited

U.S. PATENT DOCUMENTS

| | | | |
|---|---|---|---|
| 991,404 | 5/1911 | Woodworth | 123/668 |
| 1,347,476 | 7/1920 | Allyne | 29/888.061 |
| 2,534,408 | 12/1950 | Bramberry | 384/13 |
| 3,620,137 | 11/1971 | Prasse | 92/159 |
| 3,930,071 | 12/1975 | Rao et al. | 427/203 |
| 4,473,481 | 9/1984 | Fukutsuka et al. | 252/30 |
| 4,495,907 | 1/1985 | Kamo | 123/193.2 |
| 4,676,831 | 6/1987 | Engström | 75/252 |
| 5,239,955 | 8/1993 | Rao et al. | 123/193.4 |
| 5,332,422 | 7/1994 | Rao | 75/252 |
| 5,358,753 | 10/1994 | Rao et al. | 427/451 |
| 5,363,821 | 11/1994 | Rao et al. | 123/193.2 |
| 5,408,964 | 4/1995 | Rao | 123/193.2 |

FOREIGN PATENT DOCUMENTS

| | | |
|---|---|---|
| 53-41621 | 4/1978 | Japan . |
| 60-43150 | 3/1983 | Japan . |
| 1136900 | 12/1968 | United Kingdom . |

*Primary Examiner*—Hoa T. Le
*Attorney, Agent, or Firm*—Joseph W. Malleck

[57] ABSTRACT

A collection of agglomerated anti-friction grains for plasma deposition, the grains each consisting essentially of (a) $H_2O$ atomized stainless steel particles, (b) solid lubricant particles consisting of at least one of boron nitride or a eutectic of calcium fluoride and lithium fluoride, and (c) a binder holding said steel and solid lubricant particles together for plasma spraying, said binder being present in an amount of 0.5–4.0% by weight and is vaporizable at the temperature of plasma spraying and does not interfere with the deposited process.

5 Claims, 3 Drawing Sheets

AGGLOMERATED ANTI-FRICTION GRANULES FOR PLASMA DEPOSITION

BACKGROUND OF THE INVENTION

1. Technical Field

This invention relates to grain mixtures of steel and solid lubricant particles useful as a powder that is plasma sprayable and that readily transfers heat when deposited as a thin coating on surfaces exposed to high temperatures.

2. Discussion of the Prior Art

Automotive engines present a wide variety of interengaging components that generate friction as a result of interengagement. For example, sliding contact between pistons or piston rings with the cylinder bore walls, of an internal combustion engine, account for a significant portion of total engine friction. It is desirable to significantly reduce such friction by use of durable anti-friction coatings, particularly on the cylinder bore walls, to thereby improve engine efficiency and fuel economy, while allowing heat to be transmitted across such coatings to facilitate the operation of the engine cooling system.

Thick nickel plating on pistons and cylinder bore walls has been used for some time to provide corrosion resistance to iron substrates while offering only limited reduction of friction because of its softness and inadequate scuff resistance (see U.S. Pat. No. 991,404). Chromium or chromium oxide coatings have been selectively used in the 1980's to enhance wear resistance of engine surfaces, but such coatings fail to significantly reduce friction because of compatibility problems with piston rings as well as oil film formation problems and act more as a insulator. In the same time period, iron and molybdenum powders also have been jointly applied to aluminum cylinder bore walls in very thin films to promote abrasion resistance. Unfortunately, molybdenum particles and the many oxide forms of iron do not possess a low coefficient of friction that will allow for appreciable gains in engine efficiency and fuel economy.

SUMMARY OF THE INVENTION

In a first aspect, it is an object of this invention to provide a corrosion resistant metal powder useful for plasma deposition of a coating that (i) will possess a low dry coefficient of friction (i.e. about 0.2–0.35) and (ii) will readily conduct heat through the coating. To this end, the invention is a collection of agglomerated anti-friction grains for plasma deposition, the grains each consisting essentially of (a) $H_2O$ atomized stainless steel particles, (b) solid lubricant particles consisting of at least one of boron nitride or a eutectic of calcium fluoride and lithium fluoride, and (c) a binder holding said steel and solid lubricant particles together for plasma spraying, said binder being present in an amount of 0.5–4.0% by weight and is vaporizable at the temperature of plasma spraying and does not interfere with the deposition process.

In a second aspect, it is an object of this invention to provide a method of making agglomerated air-hardenable anti-friction grains useful in plasma spraying that (i) is highly economical, (ii) has a noncrushable strength in the powder form, and (iii) promotes fine flowable particles. To this end, the invention is a method of making agglomerated grains of powder suitable for plasma deposition, comprising the steps of (a) $H_2O$ atomization of a molten stream of martensitic stainless steel to produce a collection of comminuted first particles, (b) uniformly blending such first particles with solid lubricant second particles and a binder agent in an aqueous slurry, the binder agent being present in a small amount and being constituted to vaporize at the temperature of plasma spraying, and (c) mist spraying the slurry into a heated chamber to form a collection of porous rounded granules.

DETAILED DESCRIPTION AND BEST MODE

Figure 1:
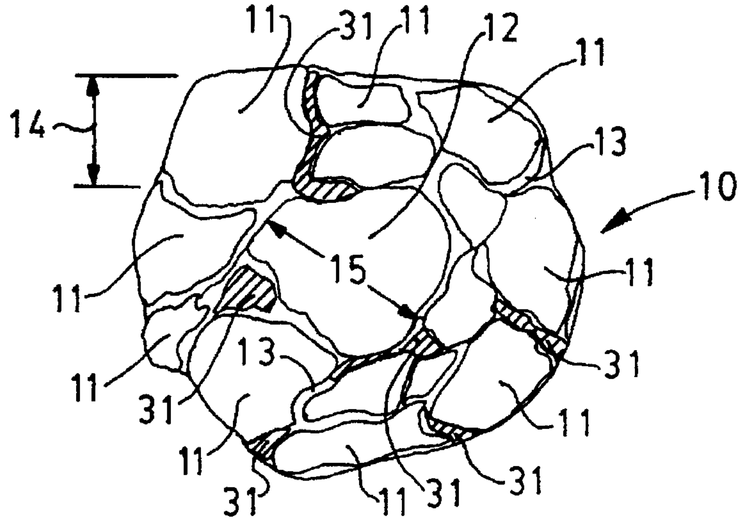
FIG. 1 is a enlarged schematic cross sectional illustration of granules of agglomerated particles fused in a plasma deposited coating and incorporating the principles of this invention.

The unique powder granules of this invention, depositable by plasma spraying, exhibit, in the powder form, a very free flowing characteristic, a high crush strength, and a very low cost of making, while also exhibiting an ultra-low coefficient of dry friction in the deposited form, while readily permitting thermal transfer of heat through the coating. As shown in FIG. 1, each powder granule 10 consists essentially of first particles 11 of stainless steel, second particles 12 of a solid lubricant consisting of at least one of boron nitride or a eutectic of calcium fluoride and lithium fluoride, and a binder agent 13 adhering the particles together and that is varporizable at the temperature of plasma spraying for deposition of the powder.

The steel particles 11 are advantageously of a martensitic stainless steel composition having an alloy content, by weight, of about 0.1–0.4% carbon, 1–8% manganese, 1–15% chromium, 1 to 5% Ni and the remainder predominantly iron. The stainless steel particles 11 should preferably contain less than 0.5% carbon by weight and more than 0.5% percent by weight chromium and 2 to 4% Mn to be air-hardenable upon exposure to air in the deposited form; the hardness of these stainless steel particles increases from about Rc 45 to 55 as a result of air-hardening. Nickel may be present in the composition but should be below 8%, above 8% adds unnecessarily to the cost of the steel particles. Nickel is usually a substitute for Manganese. The 400 stainless steel series is preferred because these particles have a starting coefficient of friction of 0.4 or less; most advantageously is the 434 stainless steel containing 0.12/0.15% by wt., 1.0–1.5% Mo, 15–18% Cr, and 420 SS, with 0.15%C; 1.25% Mo and 12 to 14% Cr. The hardness of the stainless steel particles should be in the deposited form at a level of about Rc 45 or less. The particle size of the stainless steel particles should preferably be in the range of 10–40 microns (however up to 55 microns size also can be used) they should have a quasi-spherical shape due to the $H_2O$ atomization process. The average particle size should preferably not be outside the range of 10–40 microns; if the particle size is lower than 10 microns, it will be too fine and will be difficult to process. If the particle sizes are greater, such as 60 microns, it will be too coarse and will not carry adequate amount of solid lubricant in the composite.

The solid lubricant particles 12 preferably consist of both boron nitride (which has an oil attracting characteristic and is relatively more expensive) and a eutectic of calcium fluoride and lithium fluoride (which eutectic does not have a desirable oil attracting characteristic, but is easier to plasma spray because of its lower melting temperature). A eutectic means the lowest combination melting temperature of the mixed ingredients. In a preferable combination, the boron nitride is desirably less than 3% by weight (15% by volume) of the composite. The solid lubricant should preferably have a particle size 15 of about 10–40 microns. Calcium fluoride typically has a melting temperature of 1500° C., and lithium fluoride has a melting temperature of 1100° C., the eutectic melting temperature thereby being about 800° C. The BN is desirably present in an amount of 40–100% by weight of the solid lubricants.

The binder 13 is preferably comprised of water soluble wax, such as polyvinyl alcohol or carbowax and/or water soluble gum arabic, or water soluble polyvinyl alcohol. Other organic type binders are suitable for this inventive use, but should comprise the following characteristics: water soluble, burnoff-residue-free, ashless, and does not deposit along with the plasma spray coating. The binder is preferably present in the granules 10 in an amount of 0.5–4% by weight and optimally at about 0.5%.

The agglomerated particles should have an average particle size in the range of 40–150 microns.

Figure 2:
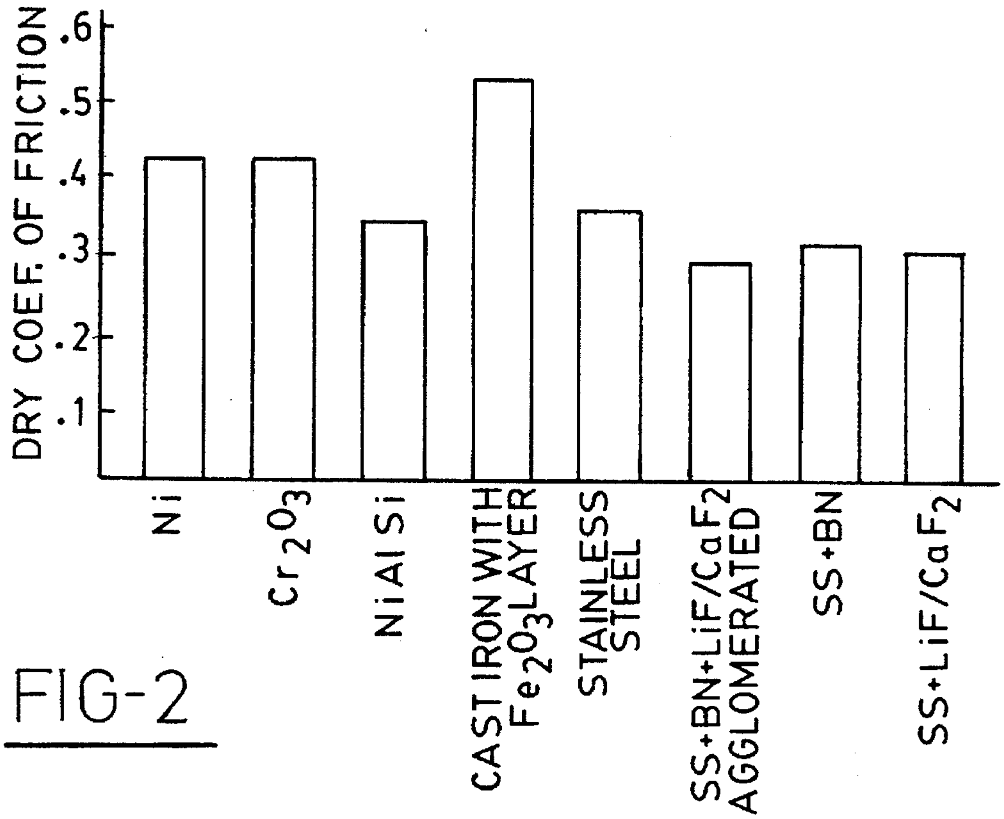
FIG. 2 is an graphical illustration comparing friction data of the granules of this invention with other powders.

Three different overall dry coefficient of friction of plasma deposited inventive granules 10 are illustrated in the bar graph of FIG. 2; these are compared to the dry coefficient of friction for prior art metallic coatings or substrates. As can be seen from FIG. 2, SS+BN+LiF/$CaF_2$ has the lowest coefficient at about 0.3, followed by SS+BN at about 0.32 and SS+LiF/$CaF_2$ at about 0.32.

To produce such agglomerated granules, the following process is used: $H_2O$ atomizing of a molten stream 17 of martensitic stainless steel (such as 440C or the stainless steel 434 or 420) to create porous first particles 18, uniformly blending the first particles 18 with solid lubricant second particles 19 along with a binder agent 20 in an aqueous slurry 21, and mist spraying (at 29) such slurry 21 into a heated chamber 22 to form a collection of porous rounded granules 23.

Figure 3:
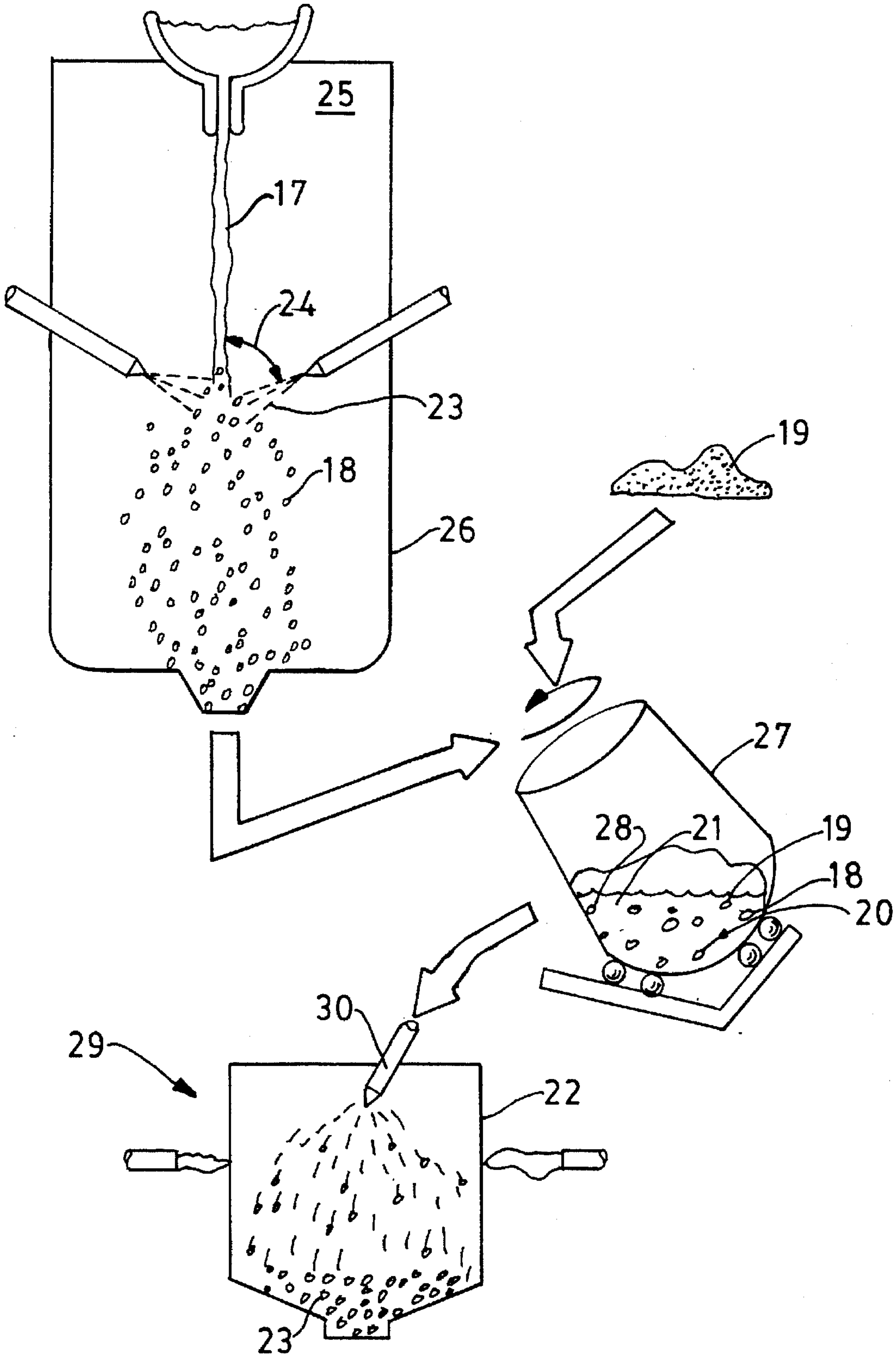
FIG. 3 is a schematic illustration of the method steps of this invention including $H_2O$ atomization of stainless steel, slurry blending, and hot chamber mist spraying.

The $H_2O$ atomization may be carried out as shown in FIG. 3 by directing a jet 41 of steam (or water) to impact at an included angle of less than 90° to the molten stream to chill and comminute the stream into the atomized particles 18. Due to the exclusion of air or other oxygen contaminants, by use of an inert or argon atmosphere 25, the only source of oxygen to unite with metal in the molten stream is the oxygen in the water or steam jet itself. The water if reacted, will release hydrogen and hydrogen adds to the nonoxidizing atmosphere in the atomization chamber.

The presence of manganese or nickel in the stainless steel allows the particles to be air-hardenable when heated back up to a temperature of about 1200°–1600° F. which will be experienced during plasma spraying. The stainless steel particles or air hardenable steel particles are collected in the bottom of the chamber 26 and thence transferred to a ball mill 27 wherein a solid lubricant supply of particles 19 is introduced. The solid lubricant particles 19 can be previously prepared from a commercial supply of boron nitride or a commercial supply of eutectic calcium fluoride and lithium fluoride. In addition, a small quantity of a binder agent 20, such as carbowax, polyvinyl alcohol, or gum arabic is added to the ball mill along with a small quantity of water to create an aqueous slurry 21. The slurry should also have introduced therein stirring or milling elements 28 and a proper dispersing agent. The amount of water added should be in the range of approximately 80% of the liquid and 20% solids. The blending within the ball mill is carried out for a sufficient period of time to ensure a homogeneous distribution of the ingredients and in some cases causing the boron nitride and eutectic particles to be smeared with stainless steel during such blending operation.

The slurry is then withdrawn from the ball mill chamber 27 and transferred to a mist spraying apparatus 29 where the slurry is sprayed through a nozzle 30 into a heated or hot chamber 22 (i.e. at about 400° F.) to form solidified particles 23 at the bottom thereof which are an agglomeration of the ingredients including the wax, solid lubricants and stainless steel. Each particle has a relatively rounded configuration with micropores 31 which is a result of the water vapor within the particles being driven out in a response to drying within the hot chamber and thereby causing the tear drop shapes to take on a rounded non-regular shape. The flowability of such resulting particles 23 is characterized by the particle shape as well as a non-sticking quality, such as mutual repulsion resulting from the binder selection. The particles 23 heat up uniformly in the plasma stream during deposition to a temperature that disintegrates the gender; the five particles continue in the stream and produce a smooth and dense coating without lumps. The cost of producing such agglomerated granules by the process of FIG. 3 is 10–30% of that required to produce coated particles by other means, such as thermochemical deposition. The very fine particles that can bunch up and clog a plasma spray system, actually yield excellent coatings when deposited from an agglomerated particle form.

Figure 4:
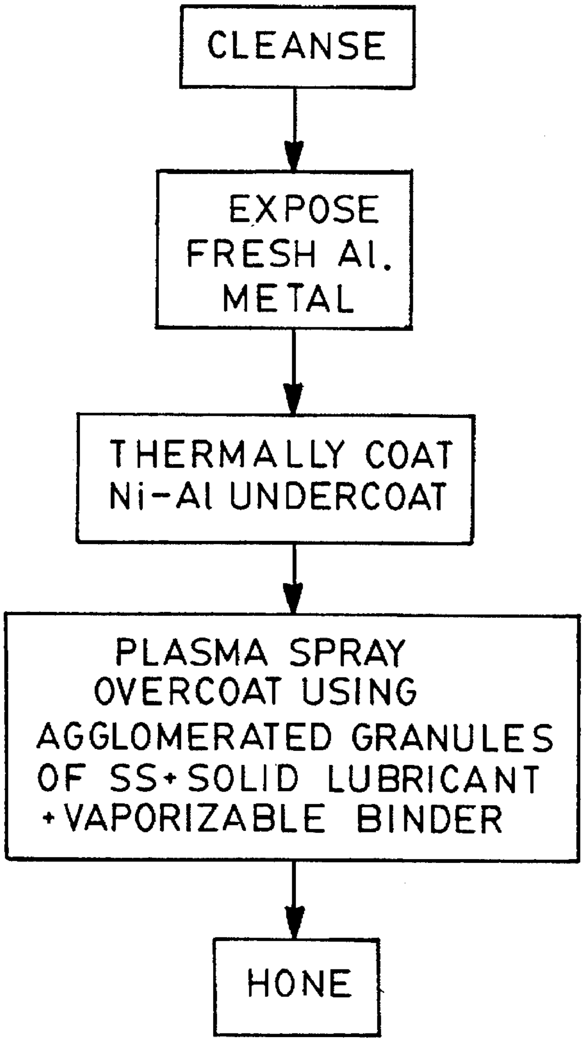
FIG. 4 is a flow diagram of the steps used to fabricate a coated engine cylinder bore wall using the granules of this invention.

To plasma coat an aluminum cylinder bore wall of an internal combustion engine with such atomized and agglomerated particles 23 (see the flow diagram of FIG. 4), the surfaces of the cylinder bore walls are cleansed and prepared by first hot vapor degreasing and subsequent washing followed by warm air drying to dry out any residual contaminants; the clean surfaces are then operated upon to expose fresh metal devoid of aluminum oxide. This can be accomplished by either machining shallow serrations in the bore wall surfaces, use of electric discharge erosion of the surfaces, high pressure water blasting or use of grit (shot) blasting of such surfaces.

If a thin coating (i.e. 110–180 microns) is applied, the metallic cylinder bore wall surfaces are centered with respect to the true cylinder bore axis by machining as part of the surface preparation prior to plasma spraying. If the coating is to be thicker (i.e. 300–500 microns), the bore surfaces need not be centered prior to coating; rather, a rough honing operation will be effective to center the coated surfaces relative to the true cylinder bore axis after coating.

Figure 5:
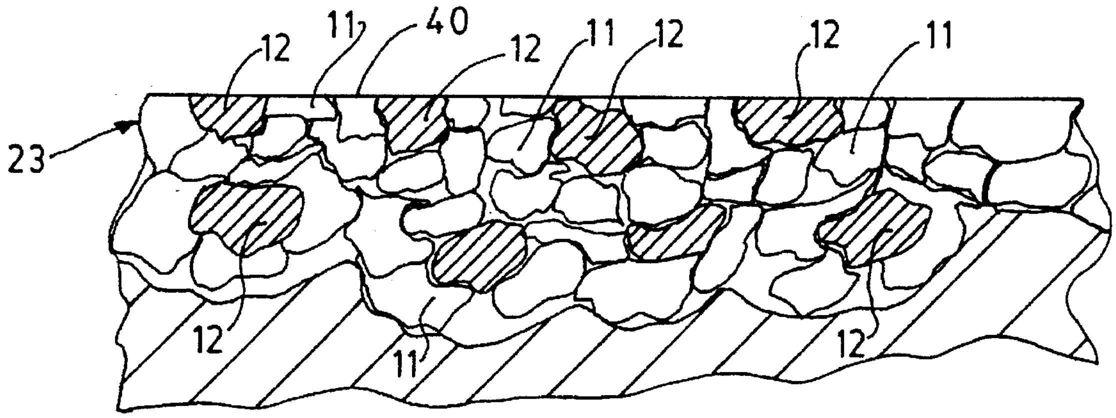
FIG. 5 is a greatly enlarged sketch of the granules as deposited in a coating and subjected to the process of FIG. 4.

Plasma coating is preferentially carried out by the techniques disclosed in co-pending U.S. Ser. No. 08/352,490 filed Dec. 9, 1994, incorporated by reference herein. Finished honing is carried out in plateaus to remove no more than about 100 microns of the coating. Honing will leave a finished surface 40 as shown in FIG. 5, which exposes the solid lubricant particles 12 which are free to smear their contents across the stainless steel particles 11 upon sliding contact use of the surface.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. Granules of agglomerated powder particles, consisting essentially of:

(a) water atomizod stainless steel particles, said stainless steel particles consisting essentially of, by weight, 0.1–0.4% carbon, 1–8% manganese, 1–5% nickel, 1–15% chromium and the remainder essentially iron;

(b) solid lubricant particles consisting of one of boron nitride or a eutectic of calcium fluoride and lithium fluoride, said solid lubricant particles having a particle size of 10–40 microns; and (c) a binder holding said stainless steel and solid lubricant particles together in a granule, said binder being present in the amount of 0.5–4% by weight of the granules and vaporizable at the temperature of plasma deposition.

2. The granules of claim 1 in which said stainless steel is air-hardenable martensitic.

3. The granules as in claim 1, in which said granules have a particle shape that is porous and irregularly rounded.

4. The granules as in claim 1, in which the average particle size of said agglomerated particles is in the range of 40–150 microns.

5. The granules as in claim 1, in which the granules have a coefficient of friction of 0.2–0.35.

* * * * *